United States Patent Office  
3,642,816  
Patented Feb. 15, 1972

---

3,642,816  
3-ACETAMIDO-1,2,3,4-TETRAHYDROCARBAZOLE  
Aram Mooradian, Schodack, N.Y., assignor to Sterling Drug Inc., New York, N.Y.  
No Drawing. Filed Aug. 10, 1967, Ser. No. 659,606  
Int. Cl. C07d 27/68  
U.S. Cl. 260—315                                   1 Claim

ABSTRACT OF THE DISCLOSURE

3 - substituted - amino - 1,2,3,4-tetrahydrocarbazoles are prepared by reacting appropriate 4-aminocyclohexanones with a phenyl hydrazine or by reacting a 3-sulfonyloxy-1,2,3,4-tetrahydrocarbazole with an appropriate amine. These compounds have useful antihistaminic or psychotropic activities, or both.

---

This invention relates to a class of chemical compounds known in the art of chemistry as 1,2,3,4-tetrahydrocarbazoles and to the preparation thereof.

More particularly, the compounds of this invention are 3-(N=B)-9-R-1,2,3,4-tetrahydrocarbazoles having the structural formula

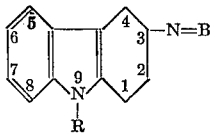

Formula I wherein N=B is NHR', NR'R", or NH—Y—NR'R", R' and R" each being lower-alkyl, phenyl-lower-alkyl, or R' and R" taken together with the nitrogen form a heterocyclic ring which can be illustrated by, but are not limited to, morpholino, thiomorpholino, piperidino, pyrrolidino, piperazino, N-lower-alkylpiperazino, and N-phenylpiperazino, Y is lower-alkylene, R is hydrogen, lower-alkyl, phenyl-lower-alkyl, lower-alkenyl, hydroxy-lower-alkyl, lower-alkanoyloxy-lower-alkyl, phenylcarbonyloxy-lower-alkyl, carboxy-lower-alkyl, lower-alkoxycarbonyl - lower - alkyl, phenyl - lower-alkoxycarbonyl-lower-alkyl, or Y–N—R'R", where Y, R' and R" have the same meaning given above.

It will be understood that as used throughout this specification, N=B and R have the meaning hereinbefore defined.

The novel compounds of the instant invention are the compounds of Formula I and the acid-addition and quaternary ammonium salts thereof. The compounds of Formula I, in free base form, are converted to the acid-addition salt form by interaction of the base with an acid. Conversely, the free bases can be regenerated from the acid-addition salt form in the conventional manner, that is, by treating the salts with strong aqueous bases, for example alkali metal hydroxides, alkali metal carbonates, and alkali metal bicarbonates. The bases thus regenerated can then be interacted with the same or a different acid to give back the same or a different acid-addition salt. Thus the novel bases and all of their acid-addition salts are readily inter-convertible.

It will thus be appreciated that Formula I not only represents the structural configuration of the bases of Formula I but is also representative of the structural entity which is common to all of my compounds of Formula I, whether in the form of the free bases or in the form of the acid-addition salts of the bases. I have found that by virtue of this common structural entity, the bases and their acid-addition salts have inherent pharmacodynamic activity of a type more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitated by side-effects ascribable to the anions.

In utilizing this pharmacodynamic activity of the salts of this invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new 3-(N=B)-9-R-1,2,3,4,-tetrahydrocarbazoles and not in any particular acid moiety or acid anion associated with the salt forms of my compounds; rather, the acid moieties or anions which can be associated in the salt forms are in themselves neither novel nor critical and therefore can be any acid anion or acid-like substance capable of salt formation with bases. In fact, in aqueous solution, the base form or water-soluble acid-addition salt form of the compounds of the invention both posses a common protonated cation or ammonium ion.

Thus the acid-addition salts discussed above and claimed herein are prepared from any organic acid, inorganic acid (including organic acids having an inorganic group therein), or organic-metallic acid as exemplified by organic mono- and polycarboxylic acids, such as found, for example, in Beilstein's Organische Chemie, 4th ed., volumes III, IV, IX, X, XIV, XVII, XIX, XXI, XXII, and XXV; organic mono- and polysulfonic and -sulfinic acids, such as found, for example, in Beilstein volumes VI, XI, XVI, and XXII; organic phosphonic and phosphinic acids, such as found, for example, in Beilstein volumes XI and XVI; organic acids of arsenic and antimony, such as found, for example, in Beilstein volume XVI; organic heterocyclic carboxylic, sulfonic, and sulfinic acids, such as found, for example, in Beilstein volumes XVIII, XXII, and XXV; acidic ion-exchange resins; and inorganic acids of any acid forming element or combination of elements, such as found in Mellor, Comprehensive Treatise on Inorganic and Theoretical Chemistry, Longman's, Green and Co., New York, N.Y. volumes I–XVI. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds, such as found, for example, in volume VI of Beilstein, acidic compounds having "activated" or acidic hydrogen atoms, as for example, picrolonic acid, or barbituric acid derivatives having an acidic proton, such as found, for example, in Cox et al. Medicinal Chemistry, vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts, for example boron trifluoride.

Representative acids for the formation of the acid-addition salts include formic acid, acetic acid, trifluoroacetic acid, isobutyric acid, alpha-mercaptopropionic acid, malic acid, fumaric acid, oxalic acid, succinic acid, succinamic acid, glutamic acid, tartaric acid, citric acid, pamoic acid, lactic acid, glycolic acid, gluconic acid, saccharic acid, ascorbic acid, penicillin, benzoic acid, 4-methoxybenzoic acid, phthalic acid, salicylic acid, acetylsalicylic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, pyromucic acid, cholic acid, pyrenecarboxylic acid, 2-pyridinecarboxylic acid, 3-indoleacetic acid, quinic acid, sulfamic acid, methanesulfonic acid, ethanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methanephosphonic acid, phenylphosphinic acid, acidic resins, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts of the compounds of Formula I are obtained by the addition of esters of strong acids to the free base form of the compounds, said esters having a molecular weight less than about 300. A preferred class of esters comprises alkyl, alkenyl, and phenyl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, for example p-chlorobenzyl chloride, 3,4-dichlorobenzyl chloride, 2,3,4,5,6-pentachlorobenzyl chloride, 4-nitrobenzyl chloride, 4-methoxybenzyl chloride, and the like.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

As in the case of the acid-addition salts, water-insolubility, high toxicity, or lack of crystalline character may make some quaternary ammonium salt species unsuitable or less desirable for use as such in a given pharmaceutical application, the water-insoluble or toxic salts can be converted to the corresponding pharmaceutically-acceptable salts by double decomposition reactions involving the anion, for example, by ion-exchange procedures. Alternatively, if the anion of the original quaternary salt forms a water-insoluble silver salt, the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid are formed.

The compounds of this invention are therapeutically active substances which possess useful pharmacodynamic properties. Thus, all of them possess either useful antihistaminic activity, or useful psychotropic activity, or possess both of these useful properties. The actual determination of the numerical biological data definitive for a particular compound, for each type of activity, is readily determined by standard test procedures by technicians having ordinary skill in pharmacological test procedures, without the need for any extensive experimentation.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol, or oil solutions or oil-water emulsions in the same manner as conventional medicinal substances are prepared.

The molecular structures of the compounds of this invention were assigned on the basis of the method of their synthesis and study of their infrared spectra, and confirmed by the correspondence between calculated and found values for the elementary analysis for representative examples.

My new compounds are prepared, in accordance with this invention, by reacting a 3-(Z—SO$_2$—O)-9-R-1,2,3,4-tetrahydrocarbazole having the formula

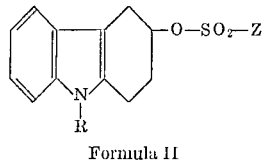

Formula II wherein Z, here and throughout this specification, is lower-alkyl, phenyl, or phenyl-lower-alkyl, with an amine of the general formula HN=B (Formula III).

The reaction can advantageously be carried out at elevated temperatures ranging from about 60° C. to about 200° C. for about one hour to about twenty-four hours. The pressure of the system may be varied over a wide range from normal atmospheric pressure to about 600 pounds per square inch. Generally, the reactants are charged into a pressure reaction vessel and heated under autogenous pressure.

One preferred method of preparing my new compounds in accordance with this invention is to heat a 3-

(Z—SO$_2$—O)-9-R-1,2,3,4-tetrahydrocarbazole (Formula II) with an amine of the general formula HN=B (Formula III), in a pressure reaction vessel, at a temperature of 90° C. to 150° C. for twenty hours.

The following reaction sequence illustrates the above method of synthesis:

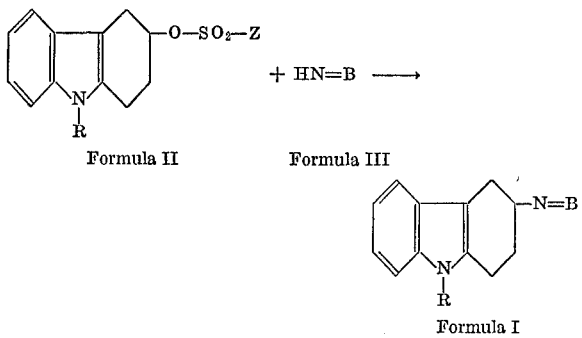

The intermediate 3-(Z—SO₂—O)-9-R-1,2,3,4-tetrahydrocarbazoles are prepared by reacting a sulfonyl chloride having the formula Z—SO₂—Cl with a 3-hydroxy-9-R-1,2,3,4-tetrahydrocarbazole having the formula

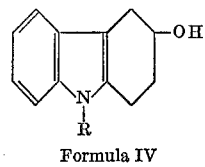

Formula IV in the presence of a basic solvent such as pyridine. The intermediate 3 - hydroxy-9-R-1,2,3,4-tetrahydrocarbazoles (Formula IV) belong to a known class of compounds which are prepared by methods well known in the art of chemistry. For example, phenylhydrazine can be reacted with 4-benzoyloxycyclohexanone in acetic acid at reflux temperature to give 3-benzoyloxy-1,2,3,4-tetrahydrocarbazole which can then be hydrolyzed by base to the corresponding 3-hydroxyl-1,2,3,4-tetrahydrocarbazole. The 3-hydroxy-9-R-1,2,3,4-tetrahydrocarbazoles, which are intermediates in the preparation of my new compounds according to this invention, are prepared in a like manner, using a 1-R-1-phenylhydrazine (Formula V).

My new compounds of Formula I, wherein N=B is dimethylamino [N(CH₃)₂], are obtained by a second method in accordance with this invention, by reacting an 1-R-1-phenylhydrazine (Formula V) with 4-dimethylaminocyclohexanone (Formula VI) in an acidic medium at elevated temperatures for from about one-half hour to twenty-four hours. For instance, the reaction is conveniently carried out by heating the reactants in acetic acid or ethanolic hydrochloric acid at reflux temperature for one hour. The following reaction sequence illustrates this second method of synthesis:

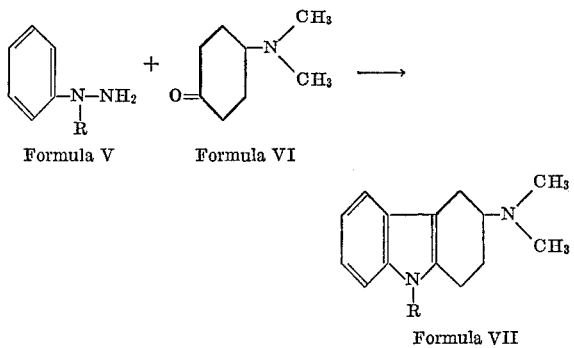

The 1-R-1-phenylhydrazine starting materials of the above-described methods of synthesis belong to a class of compounds well known in the art of organic chemistry and can be prepared by a well known method of synthesis, that is, the diazotization and subsequent reduction of the appropriate phenylamines.

The HN=B (Formula III) starting materials of the above-described method of synthesis are well known in the art of organic chemistry and can be prepared by known processes. For example, diamines represented by the formula where HN=B is NH—Y—NR'R" can be prepared by reacting an appropriate amine, for example, an N-phenylpiperazine, with a halo-lower-alkylnitrile, for example, chloroacetonitrile, to give an amino-lower-alkyl-nitrile, for example, a (4-phenyl-1-piperazinyl)-acetonitrile, which can then be reduced by conventional methods to the corresponding diamine, for example, a 2-(4-phenyl-1-piperazinyl)-ethylamine.

My new compounds of Formula I, when prepared by either of the two processes described above, can be substituted at the 9-position by hydrogen (R=H) or by other substitutents as hereinbefore described for R. When R is hydrogen, then appropriate groups are introduced at the 9-position by reacting these compounds with a compound of the formula RX (Formula VIII), where X is chloride, bromide, or iodide, in a suitable solvent and in the presence of a strong base at elevated temperatures for one-half hour to eight hours. The reaction is preferably run in dimethylformamide in the presence of sodium hydride at 75° C. to 90° C. for about two hours. The following reaction sequence illustrates this synthetic step:

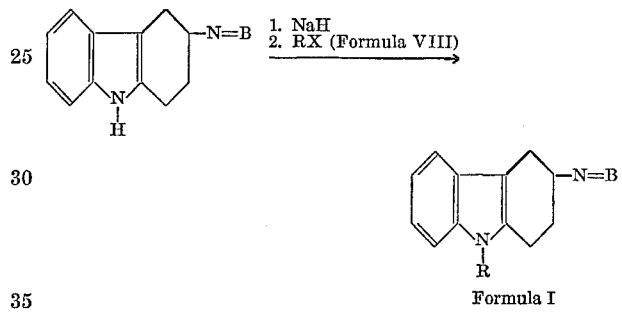

Here and elsewhere, throughout this specification, it will be understood that the benzene ring of my new tetrahydrocarbazoles of Formula I, the benzene ring of the tetrahydrocarbazole starting materials of Formulas II and IV, and the benzene ring of the phenylhydrazine starting materials of Formula V, can bear any kind and number of substituents at the available positions, such as would occur to the man skilled in organic chemistry, and are the full equivalents, in the above depicted reaction sequences, to the specific tetrahydrocarbazoles of Formula I, the specific tetrahydrocarbazole starting material of Formulas II and IV, and the specific phenylhydrazine starting materials of Formula V, depicted therein, with the proviso that one ortho position of the phenylhydrazine starting materials of Formula V must be substituted by hydrogen. Where more than one substituent is present, they can be the same or different and they can be in any of the various position combinations relative to each other. Such substituents, solely for illustration and without limiting the generality of the foregoing, include lower-alkyl, phenyl-lower-alkyl, lower-alkoxy, lower-alkylmercapto, lower-alkylsulfinyl, lower-alkylsulfonyl, halo, trihalomethyl, nitro, amino, lower-alkylamino, lower - alkanoylamino, phenyl-lower-alkoxy, hydroxy, and the like.

Here and elsewhere, throughout this specification, it will be understood that the benzene ring of phenyl can bear any kind and number of substituents as hereinbefore described.

The term "halo," as used here, includes chloro, bromo, iodo and fluoro.

As used throughout this specification, the terms "lower-alkyl," "lower-alkanoyloxy," and "lower-alkoxy" mean such groups preferably containing from one to six carbon atoms which can be arranged as straight or branched chains, and, without limiting the generality of the foregoing, are illustrated by methyl, ethyl, propyl, isopropyl, butyl, sec.-butyl, amyl, hexyl, acetoxy, propionoxy, trimethylacetoxy, methoxy, ethoxy, isobutoxy, and the like.

As used throughout the specification, the term "lower-alkylene" means a group preferably containing from two to four carbon atoms with its connecting linkages on different carbon atoms, and without limiting the generality of the foregoing, is illustrated by 1,2-ethylene, 1,3-propylene, 1,2-(1-methylethylene), 1,4-butylene, and the like.

As used throughout this specification, the term "lower-alkenyl" means a group preferably containing from three to six carbon atoms which can be arranged in straight or branched chains, and, without limiting the generality of the foregoing, is illustrated by allyl, 2-butenyl, 3-methyl-2-butenyl, and the like.

Psychotropic activity of the compounds of this invention was determined in the test procedures described hereinbelow.

(1a) RESERPINE PTOSIS PREVENTION IN MICE

Unfasted male mice, grouped in cages of eight animals each, were injected intrperitoneally (IP) with the test agent. Two hours later the mice were injected IP with 2 mg/kg. of reserpine. Three hours after the administration of reserpine the degree of eyelid ptosis was scored. If the test agent was significantly active, the minimal dose at which activity was noted was determined.

(1b) RESERPINE PTOSIS REVERSAL IN MICE

This test is similar to Test 1a described above, except the mice first received reserpine, and three hours later, when ptosis was evident, they were challenged with the test agent. Each mouse was scored one-half hour after the drug injection.

(2) OVERT BEHAVIORAL EFFECTS IN MONKEYS AND CATS

The animals were medicated orally (p.o.) with the test agent and observed for changes in behavior. The pretest agent scored overt behavioral profile was compared to the post-test agent overt behavioral profile at various intervals.

(3) SPONTANEOUS PSYCHOMOTOR ACTIVITY OF MICE

The effect of the test agent on the spontaneous activity of mice was determined in a photocell-counter activity cage. Thirty minutes before being placed in the activity cage, groups of four mice each were medicated orally (p.o.) with graded doses of the test agent. Activity (psychomotor stimulation or depression) was measured by means of a digital counter recording the number of times a beam of light impinging on a photocell was broken during a thirty-minute period.

(4) HEXOBARBITAL POTENTIATION

Groups of ten male mice were medicated orally (p.o.) and intraperitoneally (IP) with the test agent at 100 mg./kg. and 10 mg./kg. both forty and ninety minutes prior to a subhypnotic dose of sodium hexobarbital (40 mg./kg.) injected IP. The mice were tested for loss of righting reflex ten, fifteen, and twenty minutes following the sodium hexobarbital injection. The test was considered positive if the mice lost their righting reflex for one minute.

(5) MAXIMAL ELECTROSHOCK

Groups of ten male mice were medicated orally (p.o.) and intraperitoneally (IP) with the test agent at 100 mg./kg. and 10 mg./kg. both thirty and ninety minutes prior to the application of an electroshock of fifty milliamps of A.C. current for three-tenths of a second through Spiegel Corneal electrodes. The test was considered positive if the mice failed to exhibit the tonic hind-leg extension phase of the seizure.

(6) PENTYLENETETRAZOL ANTAGONISM

Groups of ten male mice were medicated orally (p.o.) and intraperitoneally (IP) with the test agent at 100 mg./kg. and 10 mg./kg. both thirty and ninety minutes prior to a rapid intravenous injection of pentylenetetrazol (50 mg./kg.). The test was considered positive if the tonic hind-leg extension phase of the seizure was blocked.

The antihistaminic activity of the compounds of this invention was determined in the following test procedure:

(7) ANTIHISTAMINE TEST PROCEDURE

The test agents, made up to appropriate concentrations in distilled water or as suspensions in 1% gum tragacanth, were injected subcutaneously (SC) thirty minutes prior to the intravenous administration of a challenging dose of 0.57 mg./kg. (as base) of histamine diphosphate into albino guinea pigs separated into groups of three pigs each. Two groups of five pigs each served as controls and these pigs received subcutaneous injections of 1 ml./kg. of 1% gum tragacanth and distilled water, respectively, thirty minutes prior to the challenging dose of the histamine. All of the control animals died. The doses at which fifty-percent of the pigs were protected by the active test agents were recorded as the $ED_{50} \pm$ standard error.

For purposes of comparison, the known compound, 3-amino-1,2,3,4-tetrahydrocarbazole hydrochloride was prepared by heating 18.8 g. of 3-p-toluenesulfonyloxy-1,2,3,4-tetrahydrocarbazole with 300 ml. of a solution of ethyl alcohol saturated with ammonia, in a pressure reaction vessel, at 100° C. to 119° C. for twelve hours. The mixture was evaporated to dryness and the residue was treated with 10% sodium hydroxide solution. The resulting free base was collected by filtration and on treatment with ethanolic hydrogen chloride was converted to 3-amino-1,2,3,4 - tetrahydrocarbazole hydrochloride which was collected by filtration and which melted at 298–299° C. (corr.).

The known 3-amino-1,2,3,4-tetrahydrocarbazole was completely inactive in the antihistamine test procedure (7).

Test procedure 1a: active at 30 mg./kg.
Test procedure 1b: active at 10 mg./kg.
Test procedure 3: active at 8 mg./kg.

My invention is illustrated by the following examples without, however, being limited thereto.

EXAMPLE 1

3-(dimethylamino)-1,2,3,4-tetrahydrocarbazole

To a refluxing solution of 9.2 g. of 4-dimethylaminocyclohexanone in 23.5 g. of glacial acetic acid was added dropwise 7.1 g. of phenylhydrazine and the mixture refluxed for one hour. The solvent was removed by distillation under reduced pressure, the residue made basic with dilute sodium hydroxide solution and extracted with ether. The ether extracts were dried and the ether evaporated to give an orange solution which crystallized upon cooling. The solid was collected by filtration then recrystallized from methanol to give 4 g. of 3-(dimethylamino)-1,2,3,4-tetrahydrocarbazole which melted at 138–142° C. (corr.).

Treatment of an absolute alcohol solution of the free base with alcoholic hydrochloric acid gave a white solid which was collected by filtration. There was thus obtained 3 - (dimethylamino) - 1,2,3,4-tetrahydrocarbazole hydrochloride which melted at 253–255° C. (uncorr.).

Test procedure 1a: active at 10 mg./kg.
Test procedure 1b: active at 10 mg./kg.
Test procedure 2: taming in monkeys at 4 mg./kg.
Test procedure 4: active at 50 mg./kg. (IP)

This compound was active as an antihistamine at $0.6 \pm 0.1$ mg./kg. in test procedure 7.

EXAMPLE 2

3-acetamido-1,2,3,4-tetrahydrocarbazole

Following the procedure given in Example 1 and using 30 g. of 4-acetamidocyclohexanone and excess phenylhydrazine there was obtained 3 g. of 3-acetamido-1,2,3,4-tetrahydrocarbazole which melted at 165–167° C. (corr.).

EXAMPLE 3

3-(dimethylamino)-6-methoxy-1,2,3,4-tetrahydrocarbazole

A mixture of 4-dimethylaminocyclohexanone hydrochloride made from 19.8 g. of 4-dimethylaminocyclohexanone and alcoholic hydrochloric acid and 24.6 g. of p-methoxyphenylhydrazine hydrochloride in ethanol was warmed on a steam bath for one hour. The ammonium chloride which precipitated was removed by filtration and the filtrate evaporated in vacuo. The solid residue was taken up in water, made basic with dilute sodium hydroxide and extracted with ether. Evaporation of the ether extracts gave an oil which crystallized upon cooling. Recrystallization from ethyl acetate gave 22.4 g. of 3-(dimethylamino) - 6 - methoxy-1,2,3,4-tetrahydrocarbazole which melted at 126–128° C. (corr.).

Test procedure 3: active at 100 mg./kg.
Test procedure 4: active at 50 mg./kg. (IP)
Test procedure 7: active at 36.5±7.3 mg./kg.

By following the procedure described in Example 3, substituting for p-methoxyphenylhydrazine hydrochloride an equivalent amount of an acid-addition salt of:

(a) 2-ethylphenylhydrazine
(b) 4-benzylphenylhydrazine
(c) 5-ethoxy-2-nitrophenylhydrazine
(d) 4-propoxyphenylhydrazine
(e) 4-methylthiophenylhydrazine
(f) 4-methylsulfinylphenylhydrazine
(g) 4-methylsulfonylphenylhydrazine
(h) 4-chloro-2-(trifluoromethyl)-phenylhydrazine
(i) 4-(diethylamino)-phenylhydrazine
(j) 4-acetamidophenylhydrazine
(k) 2-benzyloxyphenylhydrazine
(l) 2-chloro-5-methoxyphenylhydrazine
(m) 5-chloro-4-methyl-2-nitrophenylhydrazine there can be obtained respectively, according to this invention:

(a) 3-(dimethylamino)-8-ethyl-1,2,3,4-tetrahydrocarbazole
(b) 3-(dimethylamino)-6-benzyl-1,2,3,4-tetrahydrocarbazole
(c) 3-(dimethylamino)-5-ethoxy-8-nitro-1,2,3,4-tetrahydrocarbazole
(d) 3-(dimethylamino)-6-propoxy-1,2,3,4-tetrahydrocarbazole
(e) 3-(dimethylamino)-6-methylthio-1,2,3,4-tetrahydrocarbazole
(f) 3-(dimethylamino)-6-methylsulfinyl-1,2,3,4-tetrahydrocarbazole
(g) 3-(dimethylamino)-6-methylsulfonyl-1,2,3,4-tetrahydrocarbazole
(h) 3-(dimethylamino)-6-chloro-8-(trifluoromethyl)-1,2,3,4-tetrahydrocarbazole
(i) 3-(dimehylamino)-6-(diethylamino)-1,2,3,4-tetrahydrocarbazole
(j) 3-(dimethylamino)-6-acetamido-1,2,3,4-tetrahydrocarbazole
(k) 3-(dimethylamino)-8-benzyloxy-1,2,3,4-tetrahydrocarbazole
(l) 3-(dimethylamino)-8-chloro-5-methoxy-1,2,3,4-tetrahydrocarbazole
(m) 3-(dimethyamino)-5-choro-6-methy-8-nitro-1,2,3,4-tetrahydrocarbazole

EXAMPLE 4

3-(dimethylamino)-6,7-dimethoxy-1,2,3,4-tetrahydrocarbazole

Following the procedure given in Example 3 and using 14.8 g. of 4-dimethylaminocyclohexanone and 21.5 g. of 3,4-dimethoxyphenylhydrazine hydrochloride there was obtained 3 g. of 3-(dimethylamino)-6,7-dimethoxy-1,2,3,4-tetrahydrocarbazole which melted at 167–169° C. (corr.).

Test procedure 3: active at 100 mg./kg.

EXAMPLE 5

6-(benzyloxy)-3-(dimethylamino)-1,2,3,4-tetrahydrocarbazole

Following the procedure given in Example 3 and using 6.7 g. of 4-dimethylaminocyclohexanone and 11.9 g. of p-benzyloxyphenylhydrazine hydrochloride there was obtained 6-(benzyloxy)-3-(dimethylamino)-1,2,3,4-tetrahydrocarbazole which upon treatment with alcoholic hydrochloric acid gave 8.2 g. of 6-(benzyloxy)-3-(dimethylamino)-1,2,3,4-tetrahydrocarbazole hydrochloride which melted at 209–212° C. (corr.).

EXAMPLE 6

3-(dimethylamino)-6-hydroxy-1,2,3,4-tetrahydrocarbazole

The free base of Example 5, 6-(benzyloxy)-3-(dimethylamino)-1,2,3,4-tetrahydrocarbazole (20 g.) was hydrogenated for one hour over palladium on charcoal. The catalyst was removed by filtration and the filtrate evaporated to give an off-white solid. Recrystallization from ethyl acetate gave 7.4 g. of 3-(dimethylamino)-6-hydroxy-1,2,3,4-tetrahydrocarbazole which melted at 202–204° C. (corr.).

Test procedure 1a: active at 50 mg./kg.
Test procedure 1b: active at 30 mg./kg.
Test procedure 7: active at 4.8±1.8 mg./kg.

EXAMPLE 7

3-(dimethylamino)-8-methyl-1,2,3,4-tetrahydrocarbazole

Following the procedure given in Example 3 and using 10 g. of 4-dimethylaminocyclohexanone and 11.2 g. of o-tolylhydrazine hydrochloride there was obtained 4.7 g. of 3-(dimethylamino)-8-methyl-1,2,3,4-tetrahydrocarbazole in the form of its hydrochloride which melted at 285–287° C. (corr.).

Test procedure 7: active at 4.8±1.4 mg./kg.

EXAMPLE 8

8-chloro-3-(dimethylamino)-1,2,3,4-tetrahydrocarbazole

Following the procedure given in Example 3 and using 7.05 g. of 4-dimethylaminocyclohexanone and 8.95 g. of o-chlorophenylhydrazine there was obtained 4.9 g. of 8-chloro-3-(dimethylamino) - 1,2,3,4 - tetrahydrocarbazole which melted at 154–157° C. (corr.).

Test procedure 1b: active at 50 mg./kg.
Test procedure 5: active at 100 mg./kg.
Test procedure 7: active at 33.5±6.5 mg./kg.

EXAMPLE 9

5,8-dichloro-3-(dimethylamino)-1,2,3,4-tetrahydrocarbazole

Following the procedure given in Example 3 and using 7.05 g. of 4-dimethylaminocyclohexanone and 10.7 g. of 2,5-dichlorophenylhydrazine hydrochloride there was obtained 4.1 g. of 5,8-dichloro-3-(dimethylamino)-1,2,3,4-tetrahydrocarbazole which melted at 206–209° C. (corr.).

Test procedure 1a: active at 30 mg./kg.
Test procedure 1b: active at 30 mg./kg.
Test procedure 4: active at 100 mg./kg. (IP)

EXAMPLE 10

3-(dimethylamino)-6-nitro-1,2,3,4-tetrahydrocarbazole

Following the procedure given in Example 3 and using 10 g. of 4-dimethylaminocyclohexanone and 10.8 g. of p-nitrophenylhydrazine there was obtained 2.2 g. of 3-(dimethylamino)-6-nitro-1,2,3,4-tetrahydrocarbazole which melted at 226–229° C. (corr.).

Test procedure 3: active at 128 mg./kg.

EXAMPLE 11

9-(p-chlorobenzyl)-3-(dimethylamino)1,2,3,4-tetrahydrocarbazole

A mixture of 6.7 g. of 3-(dimethylamino)-1,2,3,4-tetrahydrocarbzole and 1.35 g. of sodium hydride in 75 ml. of dimethylformamide was heated on a steam bath and 5 g. of p-chlorobenzyl chloride in 10 ml. of dimethylformamide added dropwise. Heating was continued for two hours, after which the mixture was cooled and diluted with water. The oil which remained after decantation of the water was dissolved in hexane and chromatographed on an aluminum oxide column. Elution of the column with equal amounts of an ether-hexane mixture gave a solid which was collected by filtration. Recrystallization from an ether-hexane mixture gave 4.9 g. of 9-(p-chlorobenzyl)-3 - (dimethylamino) - 1,2,3,4-tetrahydrocarbazole which melted at 107–108° C. (corr.).

Test procedure 3: active at 300 mg./kg.

EXAMPLE 12

3-(dimethylamino)-9-[2-(dimethylamino)ethyl]-1,2,3,4-tetrahydrocarbazole

Following the procedure given in Example 11 and using 6.7 g. of 3-(dimethylamino)-1,2,3,4-tetrahydrocarbazole, 1.35 g. of sodium hydride and 3.37 g. of dimethylaminoethyl chloride in 75 ml. of dimethylformamide there was obtained 5.6 g. of 3-(dimethylamino)-9-[2-(dimethylamino)ethyl]-1,2,3,4-tetrahydrocarbazole in the form of its dihydrochloride salt which melted as 269–270° C. (dec.) (corr.).

Test procedure 3: active at 16 mg./kg. (SC)
Test procedure 7: active at 30 mg./kg.

EXAMPLE 13

3-(dimethylamino)-9-[2-(3,4,5-trimethoxybenzoyloxy)ethyl]-1,2,3,4-tetrahydrocarbazole Following the procedure given in Example 11 and using 6.7 g. of 3-(dimethylamino)-1,2,3,4-tetrahydrocarbazole, 1.35 g. of sodium hydride and 8.65 g. of 2-chloroethyl 3,4,5-trimethoxybenzoate there was obtained after recrystallization from an ethyl acetate-ether mixture 2.4 g. of 3-(dimethylamino)-9-[2-(3,4,5-trimethoxybenzoyloxy)ethyl]1,2,3,4-tetrahydrocarbazole which melted at 127–131° C. (corr.).

Test procedure 3: active at 300 mg./kg.

By heating a solution of 3-(dimethylamino)-9-[2-(3, 4,5-trimethoxybenzoyloxy)ethyl] - 1,2,3,4-tetrahydrocarbazole in aqueous ethyl alcohol with an excess of potassium hydroxide at 70° C. for one hour, there can be obtained, according to this invention, 3-(dimethylamino)-9-(2-hydroxyethyl)-1,2,3,4-tetrahydrocarbazole.

EXAMPLE 14

9-carbethoxymethyl-3-(dimethylamino)-1,2,3,4-tetrahydrocarbazole

To a mixture of 6.7 g. of 3-(dimethylamino)-1,2,3,4-tetrahydrocarbazole and 1.35 g. of sodium hydride in 75 ml. of dimethylformamide was added 5.2 g. of ethyl bromoacetate and the mixture stirred and heated for one hour on a steam bath. The reaction mixture was cooled, diluted with water and extracted with ether. The ether extracts were dried, the ether evaporated and the residual oil treated with ethereal hydrochloric acid. The solid which precipitated was collected by filtration and recrystallized from isopropanol to give 2.9 g. of 9-carbethoxymethyl-3-(dimethylamino)-1,2,3,4-tetrahydrocarbazole in the form of its hydrochloride which melted at 242–253° C. (corr.).

Test procedure 1a: active at 10 mg./kg.
Test procedure 3: active at 300 mg./kg.
Test procedure 7: active at 0.03±0.003 mg./kg.

By heating a solution of 9-carbethoxymethyl-3-(dimethylamino) - 1,2,3,4 - tetrahydrocarbazole in aqueous ethyl alcohol with an excess of potassium hydroxide at 70° C. for one hour, there can be obtained, according to this invention, 9 - carboxymethyl - 3 - (dimethylamino)-1,2,3,4-tetrahydrocarbazole.

EXAMPLE 15

3-(dimethylamino)-9-ethyl-1,2,3,4-tetrahydrocarbazole

Following the procedure given in Example 11 and using 6.7 g. of 3-(dimethylamino)-1,2,3,4-tetrahydrocarbazole, 1.35 g. of sodium hydride and 5 g. of ethyl iodide there was obtained 7 g. of 3-(dimethylamino)-9-ethyl-1,2,3,4-tetrahydrocarbazole which was isolated in the form of its hydrochloride salt which melted at 292–293° C. (dec.) (corr.).

Test procedure 1a: active at 30 mg./kg.
Test procedure 1b: active at 50 mg./kg.
Test procedure 7: active at 0.2±0.03 mg./kg.

EXAMPLE 16

9-allyl-3-(dimethylamino)-1,2,3,4-tetrahydrocarbazole

Following the procedure given in Example 11 and using 6.7 g. of 3-(dimethylamino)-1,2,3,4-tetrahydrocarbazole, 1.35 g. of sodium hydride and 4 g. of allyl bromide there was obtained 4 g. of 9-allyl-3-(dimethylamino)-1,2,3,4-tetrahydrocarbazole in the form of its hydrochloride salt which melted at 277–279° C. (dec.) (corr.).

Test procedure 7: active at 0.1±0.02 mg./kg.

EXAMPLE 17

3-(dimethylamino)-9-[3-(dimethylamino)propyl]-1,2,3,4-tetrahydrocarbazole

Following the procedure given in Example 11 and using 6.7 g. of 3-(dimethylamino)-1,2,3,4-tetrahydrocarbazole, 1.35 g. of sodium hydride and 3.6 g. of 3-dimethylaminopropyl chloride there was obtained 8.5 g. of 3 - (dimethylamino) - 9 - [3-(dimethylamino)propyl] 1,2,3,4-tetrahydrocarbazole in the form of its dihydrochloride salt which melted at 302–305° C. (dec.) (corr.).

Test procedure 1a: active at 30 mg./kg.
Test procedure 1b: active at 30 mg./kg.
Test procedure 7: active at 30 mg./kg.

By following the procedure described in Example 11, substituting for p-chlorobenzyl chloride an equivalent amount of:

(a) n-hexyl chloride
(b) 2-phenylethyl chloride
(c) 3,3-dimethylallyl bromide
(d) 2-chloroethyl acetate
(e) benzyl bromoacetate
(f) 2-dimethylaminopropyl chloride
(g) 2-(4-morpholinyl)-ethyl chloride
(h) 2-(4-thiomorpholinyl)-ethyl chloride
(i) 2-(1-piperidinyl)-ethyl chloride
(j) 2-(1-pyrrolidinyl)-ethyl chloride
(k) 2-(1-piperazinyl)-ethyl chloride
(l) 2-(4-methyl-1-piperazinyl)-ethyl chloride
(m) 2-(4-phenyl-1-piperazinyl)-ethyl chloride
(n) 4-benzyloxybenzyl chloride
(o) 2,6-dichlorobenzyl bromide
(p) 1-bromo-3-(3-methoxyphenyl)-propane
(q) 2-hydroxy-5-nitrobenzyl bromide
(r) 4-methylbenzyl chloride
(s) 2,5-dimethylbenzyl chloride
(t) 2-chloroethyl 3-(trifluoromethyl)-benzoate
(u) 2-chloroethyl pentafluorobenzoate
(v) 2-chloroethyl 4-nitrobenzoate (w) 2,6-dichlorobenzyl bromoacetate
(x) 3,4,5-trimethoxybenzyl bromoacetate there can be obtained respectively, according to this invention:

(a) 3-(dimethylamino)-9-(n-hexyl)-1,2,3,4-tetrahydrocarbazole
(b) 3-(dimethylamino)-9-(2-phenylethyl)-1,2,3,4-tetrahydrocarbazole
(c) 3-(dimethylamino)-9-(3,3-dimethylallyl)-1,2,3,4-tetrahydrocarbazole
(d) 3-(dimethylamino)-9-(2-acetoxyethyl)-1,2,3,4-tetrahydrocarbazole
(e) 3-(dimethylamino)-9-(carbobenzoxymethyl)-1,2,3,4-tetrahydrocarbazole
(f) 3-(dimethylamino)-9-(2-dimethylaminopropyl)-1,2,3,4-tetrahydrocarbazole
(g) 3-(dimethylamino)-9-[2-(-morpholinyl)-ethyl] 1,2,3,4-tetrahydrocarbazole
(h) 3-(dimethylamino)-9-[2-(4-thiomorpholinyl)-ethyl]-1,2,3,4-tetrahydrocarbazole
(i) 3-(dimethylamino)-9-[2-(1-piperidinyl)-ethyl]-1,2,3,4-tetrahydrocarbazole
(j) 3-(dimethylamino)-9-[2-(1-pyrrolidinyl)-ethyl]-1,2,3,4-tetrahydrocarbazole
(k) 3-(dimethylamino)-9-[2-(1-piperazinyl)-ethyl]-1,2,3,4-tetrahydrocarbazole
(l) 3-(dimethylamino)-9-[2-(4-methyl-1-piperazinyl)-ethyl]-1,2,3,4-tetrahydrocarbazole
(m) 3-(dimethylamino)-9-[2-(4-phenyl-1-piperazinyl)-ethyl]-1,2,3,4-tetrahydrocarbazole
(n) 3-(dimethylamino)-9-(4-benzyloxybenzyl)-1,2,3,4-tetrahydrocarbazole
(o) 3-(dimethylamino)-9-(2,6-dichlorobenzyl)-1,2,3,4-tetrahydrocarbazole
(p) 3-(dimethylamino)-9-[3-(3-methoxyphenyl)-1-propyl]1,2,3,4-tetrahydrocarbazole
(q) 3-(dimethylamino)-9-(2-hydroxy-5-nitrobenzyl)-1,2,3,4-tetrahydrocarbazole
(r) 3-(dimethylamino)-9-(4-methylbenzyl)-1,2,3,4-tetrahydrocarbazole
(s) 3-(dimethylamino)-9-(2,5-dimethylbenzyl)-1,2,3,4-tetrahydrocarbazole
(t) 2-[3-(dimethylamino)-1,2,3,4-tetrahydrocarbazol-9-yl]-ethyl 3-(trifluoromethyl)-benzoate
(u) 2-[3-(dimethylamino)-1,2,3,4-tetrahydrocarbazol-9-yl]-ethyl pentafluorobenzoate
(v) 2-[3-(dimethylamino)-1,2,3,4-tetrahydrocarbazol-9-yl]-ethyl 4-nitrobenzoate
(w) 2,6-dichlorobenzyl 3-(dimethylamino)-1,2,3,4-tetrahydrocarbazole-9-acetate
(x) 3,4,5-trimethoxybenzyl 3-(dimethylamino)-1,2,3,4-tetrahydrocarbazole-9-acetate The halo starting materials (t), (u), (v), (w), and (x), disclosed above, can be prepared readily by conventional processes, for example, by the reaction of the appropriate alcohols with the appropriate acid halides in the presence of a base.

EXAMPLE 18

3-(butylamino)-1,2,3,4-tetrahydrocarbazole

A mixture of 25 g. of 3-(p-toluenesulfonyloxy)-1,2,3,4-tetrahydrocarbazole (hereinafter 3-tosyloxy-1,2,3,4-tetrahydrocarbazole) and 125 ml. of n-butylamine was heated in an autoclave at a temperature ranging between 120–140° C. for twenty hours. The excess amine was removed by distillation in vacuo, the residue made basic with sodium hydroxide solution, and the mixture extracted with ether. The ether extracts were dried and the ether evaporated to give an oil which crystallized upon standing. The crystals were collected by filtration and recrystallized from an ether-pentane mixture. There was thus obtained 8 g. of 3-(butylamino)-1,2,3,4-tetrahydrocarbazole which melted at 110–111° C. (corr.).

The 3-tosyloxy-1,2,3,4-tetrahydrocarbazole was prepared by warming a mixture of 152 g. of 3-hydroxy-1,2,3,4-tetrahydrocarbazole and 171 g. of tosyl chloride in 410 ml. of pyridine. The solid which separated was collected by filtration, slurried in isopropanol and filtered to give 247 g. of 3-tosyloxy-1,2,3,4-tetrahydrocarbazole which melted at 148–151° C.

Test procedure 1b: active at 10 mg./kg.

EXAMPLE 19

3-(benzylamino)-1,2,3,4-tetrahydrocarbazole

Following the procedure given in Example 18 and using 25 g. of 3-tosyloxy-1,2,3,4-tetrahydrocarbazole and 125 ml. of benzylamine there was obtained 9.4 g. of 3-(benzylamino)-1,2,3,4-tetrahydrocarbazole which melted at 109–115° C. (corr.).

Test procedure 2: decrease in viciousness and aggressiveness in monkeys at 4 mg./kg.
Test procedure 3: active at 300 mg./kg.

EXAMPLE 20

3-(propylamino)-1,2,3,4-tetrahydrocarbazole

Following the procedure given in Example 18 and using 34 g. of 3-tosyloxy-1,2,3,4-tetrahydrocarbazole and 200 ml. of propylamine there was obtained 9.8 g. of 3-(propylamino)-1,2,3,4-tetrahydrocarbazole which melted at 124–125° C. (corr.).

EXAMPLE 21

3-(dimethylamino)-6-methyl-1,2,3,4-tetrahydrocarbazole

Following the procedure given in Example 18 and using 35.5 g. of 6-methyl-3-tosyloxy-1,2,3,4-tetrahydrocarbazole and 200 ml. of dimethylamine there was obtained 1.6 g. of 3-(dimethylamino) - 6 - methyl-1,2,3,4-tetrahydrocarbazole which melted at 116–118° C. (corr.).

Test procedure 7: active at 18.5±4.7 mg./kg.

The intermediate 6-methyl-3-tosyloxy-1,2,3,4-tetrahydrocarbazole was prepared from 63.3 g. of 3-hydroxy-6-methyl-1,2,3,4-tetrahydrocarbazole and 66.4 g. of tosyl chloride using the procedure described in Example 18 for the preparation of 3-tosyloxy-1,2,3,4-tetrahydrocarbazole. There was thus obtained 59.7 g. of 6-methyl-3-tosyloxy-1,2,3,4-tetrahydrocarbazole which melted at 125–127° C.

The 3-hydroxy - 6 - methyl-1,2,3,4-tetrahydrocarbazole used above was prepared by hydrolysis of 99.4 g. of 3-benzoyloxy-6-methyl - 1,2,3,4-tetrahydrocarbazole with 21 g. of potassium hydroxide in 300 ml. of water. The hydrolysis was carried out by refluxing the reaction mixture for two hours and collecting the resultant solid by filtration. There was thus obtained 63 g. of 3-hydroxy-6-methyl-1,2,3,4-tetrahydrocarbazole.

The 3-benzoyloxy-6-methyl - 1,2,3,4 - tetrahydrocarbazole used above was prepared by refluxing 218 g. of 4-benzoyloxycyclohexanone and 110 g. of p-tolylhydrazine in 800 ml. of acetic acid. The solid 3-benzoyloxy-6-methyl-1,2,3,4-tetrahydrocarbazole which separated was collected by filtration and dried to give 239 g. which melted at 192–195° C.

EXAMPLE 22

3-(4-phenyl-1-piperazinyl)-1,2,3,4-tetrahydrocarbazole

Following the procedure given in Example 18 and using 5.7 g. of 3-tosyloxy-1,2,3,4-tetrahydrocarbazole and 2.5 g. of 4-phenylpiperazine there was obtained 3-(4-phenyl-1-piperazinyl)-1,2,3,4-tetrahydrocarbazole which melted at 230–232° C. (corr.).

Test procedure 3: active at 300 mg./kg.
Test procedure 4: active at 100 mg./kg. (IP)
Test procedure 6: active at 100 mg./kg.

EXAMPLE 23

3-(methylamino)-1,2,3,4-tetrahydrocarbazole

A mixture of 17 g. of 3-tosyloxy-1,2,3,4-tetrahydrocarbazole and 25 g. of 40% methylamine in 200 ml. of 2-ethoxyethanol containing 5 g. of sodium bicarbonate was heated on a steam bath for one hour then left standing overnight at room temperature. The solvent was removed by distillation and the residue taken up in ether and the mixture filtered. Evaporation of the filtrate gave a residue which crystallized upon trituration with ether. The 3-(methylamino)-1,2,3,4-tetrahydrocarbazole thus obtained melted at 134–136° C. (corr.).

Test procedure 1a: active at 30 mg./kg.
Test procedure 1b: active at 10 mg./kg.
Test procedure 2: taming in monkeys at 4 mg./kg.
Test procedure 7: active at 5.2±0.1 mg./kg.

EXAMPLE 24

3-(ethylamino)-1,2,3,4-tetrahydrocarbazole

Following the procedure given in Example 18 and using 25 mg. of 3-tosyloxy-1,2,3,4-tetrahydrocarbazole and 90 g. of ethylamine there was obtained 3 g. of 3-(ethylamino)-1,2,3,4-tetrahydrocarbazole which melted at 128–129° C. (corr.).

Test procedure 2: taming in monkeys at 4 mg./kg.
Test procedure 5: active at 100 mg./kg. (p.o.)
Test procedure 6: active at 40 mg./kg.

EXAMPLE 25

3-(1-piperidyl)-1,2,3,4-tetrahydrocarbazole

Following the procedure given in Example 18 and using 25 g. of 3-tosyloxy-1,2,3,4-tetrahydrocarbazole and 100 g. of piperidine there was obtained 6.2 g. of 3-(1-piperidyl)-1,2,3,4-tetrahydrocarbazole which melted at 77–115° C. (corr.).

Test procedure 3: active at 64 mg./kg.
Test procedure 4: active at 100 mg./kg. (IP)
Test procedure 5: active at 100 mg./kg. (IP)
Test procedure 6: active at 100 mg./kg.
Test procedure 7: active at 3.1±0.7 mg./kg.

EXAMPLE 26

3-(4-morpholinyl)-1,2,3,4-tetrahydrocarbazole

Following the procedure given in Example 18 and using 34 g. of 3-tosyloxy-1,2,3,4-tetrahydrocarbazole and 200 g. of morpholine there was obtained 13 g. of 3-(4-morpholinyl)-1,2,3,4-tetrahydrocarbazole which melted at 131–134° C. (corr.).

Test procedure 3: active at 64 mg./kg.
Test procedure 4: active at 100 mg./kg. (p.o.)
Test procedure 5: active at 100 mg./kg. (IP)
Test procedure 6: active at 39 mg./kg.

EXAMPLE 27

3-(1-pyrrolidinyl)-1,2,3,4-tetrahydrocarbazole

Following the procedure given in Example 18 and using 34 g. of 3-tosyloxy-1,2,3,4-tetrahydrocarbazole and 99 g. of pyrrolidine there was obtained 13 g. of 3-(1-pyrrolidinyl)-1,2,3,4-tetrahydrocarbazole which melted at 200–205° C. (corr.).

Test procedure 3: active at 300 mg./kg.
Test procedure 7: active at 0.4±0.1 mg./kg.

EXAMPLE 28

6-chloro-3-(dimethylamino) - 1,2,3,4-tetrahydrocarbazole

Following the procedure given in Example 18 and using 38 g. of 6-chloro-3-tosyloxy-1,2,3,4-tetrahydrocarbazole and 250 ml. of dimethylamine there was obtained 8.6 g. of 6-chloro-3-(dimethylamino)-1,2,3,4-tetrahydrocarbazole which melted at 181–184° C. (corr.).

Test procedure 1a: active at 1 mg./kg.

The 6 - chloro-3-tosyloxy-1,2,3,4-tetrahydrocarbazole used above was prepared from 67.7 g. of 6-chloro-3-hydroxy-1,2,3,4-tetrahydrocarbazole and 59 g. of p-tosyl chloride following the procedure described in Example 18. There was thus obtained 101 g. of 6-chloro-3-tosyloxy-1,2,3,4-tetrahydrocarbazole.

The 6 - chloro-3-hydroxy-1,2,3,4-tetrahydrocarbazole used above was prepared by hydrolysis of 24.2 g. of 3-benzoyloxy-6-chloro-1,2,3,4-tetrahydrocarbazole with 5 g. of potassium hydroxide in 50 ml. of water using the procedure given in Example 21 for the preparation of the corresponding 6-methyl compound. There was thus obtained 15.4 g. of 6-chloro-3-hydroxy-1,2,3,4-tetrahydrocarbazole which melted at 131–133° C.

The 3 - benzoxyloxy-6-chloro-1,2,3,4-tetrahydrocarbazole used above was prepared by the reaction of 14.3 g. of p-chlorophenylhydrazine and 21 g. of 4-benzoyloxycyclohexanone using the procedure described in Example 21 for the preparation of the corresponding 6-methyl compound. There was thus obtained 18 g. of 3-benzoyloxy-6-chloro-1,2,3,4-tetrahydrocarbazole which melted at 158–160° C.

EXAMPLE 29

3 - (dimethylamino)-9-methyl-1,2,3,4-tetrahydrocarbazole

Following the procedure in Example 18 and using 36.2 g. of 9-methyl-3-tosyloxy-1,2,3,4-tetrahydrocarbazole and 250 ml. of dimethylamine there was obtained 9.5 g. of 3 - (dimethylamino)-9-methyl-1,2,3,4-tetrahydrocarbazole in the form of its hydrochloride salt and which melted at >300° C.

Test procedure 1a: active at 10 mg./kg.
Test procedure 1b: active at 10 mg./kg.
Test procedure 7: active at 0.6±0.1 mg./kg.

The 9 - methyl-3-tosyloxy-1,2,3,4-tetrahydrocarbazole was prepared from 49 g. of 3-hydroxy-9-methyl-1,2,3,4-tetrahydrocarbazole and 49 g. of tosyl chloride using the procedure described in Example 21 for the preparation of 6-methyl-3-tosyloxy-1,2,3,4-tetrahydrocarbazole. There was thus obtained 81 g. of 9-methyl-3-tosyloxy-1,2,3,4-tetrahydrocarbazole which melted at 155–157° C.

The 3 - hydroxy-9-methyl-1,2,3,4-tetrahydrocarbazole was prepared by hydrolysis of 9.1 g. of 3-benzoyloxy-9-methyl-1,2,3,4-tetrahydrocarbazole and 1.95 g. of potassium hydroxide in 100 ml. of 50% ethanol using the procedure described in Example 21 for the preparation of 3 - hydroxy-6-methyl-1,2,3,4-tetrahydrocarbazole. There was thus obtained 48 g. of 3-hydroxy-9-methyl-1,2,3,4-tetrahydrocarbazole which melted at 104–106° C.

The 3-benzoyloxy-9-methyl-1,2,3,4-tetrahydrocarbazole was prepared by the reaction of 34.8 g. of 1-phenyl-1-methylhydrazine and 62 g. of 4-benzoyloxycyclohexanone using the procedure described in Example 21 for the preparation of 3-benzoyloxy-6-methyl-1,2,3,4-tetrahydrocarbazole. There was thus obtained 71 g. of 3-benzoyloxy-9-methyl-1,2,3,4-tetrahydrocarbazole which melted at 93–96° C.

EXAMPLE 30

9 - benzyl-3-(dimethylamino)-1,2,3,4-tetrahydrocarbazole

Following the procedure given in Example 21 and using 25 g. of 9-benzyl-3-tosyloxy-1,2,3,4-tetrahydrocarbazole and 50 ml. of dimethylamine there was obtained 3.2 g. of 9 - benzyl-3-(dimethylamino)-1,2,3,4-tetrahydrocarbazole which melted at 81–83° C. (corr.).

Test procedure 3: active at 32 mg./kg.
Test procedure 7: active at 0.5±0.1 mg./kg.

The 9 - benzyl-3-tosyloxy-1,2,3,4-tetrahydrocarbazole, melting point 150–152° C., was prepared by isolation of 32 g. of 9-benzyl-3-hydroxy-1,2,3,4-tetrahydrocarbazole, melting point 105–111° C., which was prepared by hydrolysis of 61 g. of 9-benzyl-3-benzoyloxy-1,2,3,4-tetrahydrocarbazole. The latter, melting point 125–127° C., was prepared from 23.4 g. of phenylbenzylhydrazine and 22 g. of 4-benzoyloxycyclohexanone.

EXAMPLE 31

3-[2-(diethylamino)ethylamino]-1,2,3,4-tetrahydrocarbazole

Following the procedure given in Example 18 and using 34 g. of 3-tosyloxy-1,2,3,4-tetrahydrocarbazole and 200 ml. of 3-diethylaminoethylamine there was obtained 11.4 g. of 3-[2-(diethylamino)ethylamino]-1,2,3,4-tetrahydrocarbazole which melted at 106–107° C. (corr.).

Test procedure 1a: active at 50 mg./kg.
Test procedure 3: active at 32 mg./kg.

By following the procedure described in Example 18, substituting for n-butylamine an equivalent amount of:

(a) n-hexylamine
(b) 3-phenylpropylamine
(c) di-n-hexylamine
(d) N-methyl-n-hexylamine
(e) dibenzylamine
(f) N-benzyl-N-methylamine
(g) thiomorpholine
(h) piperazine
(i) N-methylpiperazine
(j) 4-dimethylaminobutaylamine
(k) 3-dimethylaminobutylamine
(l) 2-(4-morpholinyl)-ethylamine
(m) 2(4-thiomorpholinyl)-ethylamine
(n) 2-(1-piperidinyl)-ethylamine
(o) 2-(1-pyrrolidinyl)-ethylamine
(p) 2-(1-piperazinyl)-ethylamine
(q) 2-(4-methyl-1-piperazinyl)-ethylamine
(r) 2-(4-phenyl-1-piperazinyl)-ethylamine
(s) 2-[4-(2,6-dimethylphenyl)-1-piperazinyl]-ethylamine
(t) 2-[4-(3-chloro-4-methylphenyl)-1-piperazinyl]-ethylamine
(u) 2-[4-(2-methoxy-5-chlorophenyl)-1-piperazinyl]-ethylamine
(v) 2-[4-(4-methylthiophenyl)-1-piperazinyl]-ethylamine
(w) 2-[4-(2-butoxyphenyl)-1-piperazinyl]-ethylamine there can be obtained respectively, according to this invention:

(a) 3-(n-hexylamino)-1,2,3,4-tetrahydrocarbazole
(b) 3-(3phenylpropylamino)-1,2,3,4-tetrahydrocarbazole
(c) 3-(di-n-hexylamino-1,2,3,4-tetrahydrocarbazole
(d) 3-(N-methyl-n-hexylamino)-1,2,3,4-tetrahydrocarbazole
(e) 3-(dibenzylamino)-1,2,3,4-tetrahydrocarbazole
(f) 3-(N-benzyl-N-methylamino)-1,2,3,4-tetrahydrocarbazole
(g) 3-(4-thiomorpholinyl)-1,2,3,4-tetrahydrocarbazole
(h) 3-(1-piperazinyl)-1,2,3,4-tetrahydrocarbazole
(i) 3-(4-methyl-1-piperazinyl)-1,2,3,4-tetrahydrocarbazole
(j) 3-(4-dimethylaminobutylamino)-1,2,3,4-tetrahydrocarbazole
(k) 3-(3-dimethylaminobutylamino)-1,2,3,4-tetrahydrocarbazole
(l) 3-[2-(4-morpholinyl)-ethylamino]-1,2,3,4-tetrahydrocarbazole
(m) 3-[2-(4-thiomorpholinyl)-ethylamino]-1,2,3,4-tetrahydrocarbazole
(n) 3-[2-(1-piperidinyl)-ethylamino]-1,2,3,4-tetrahydrocarbazole
(o) 3-[2-(1-pyrrolidinyl)-ethylamino]-1,2,3,4-tetrahydrocarbazole
(p) 3-[2-(1-piperazinyl)-ethylamino]-1,2,3,4-tetrahydrocarbazole
(q) 3-[2-(4-methyl-1-piperazinyl)-ethylamino]-1,2,3,4-tetrahydrocarbazole
(r) 3-[2,(4-phenyl-1-piperazinyl)ethylamino]-1,2,3,4-tetrahydrocarbazole
(s) 3-{2-[4-(2,6-dimethylphenyl)-1-piperazinyl]-ethylamino}-1,2,3,4,-tetrahydrocarbazole
(t) 3-{2-[4-(3-chloro-4-methylphenyl)-1-piperazinyl]-ethylamino}-1,2,3,4-tetrahydrocarbazole
(u) 3-{2-[4-(2-methoxy-5-chlorophenyl)-1-piperazinyl]-ethylamino}-1,2,3,4-tetrahydrocarbazole
(v) 3-{2-[4-(4-methylthophenyl)-1-piperazinyl]-ethylamino}-1,2,3,4-tetrahydrocarbazole
(w) 3-{2-[4-(2-butoxyphenyl)-1-piperazinyl]-ethylamino}-1,2,3,4-tetrahydrocarbazole

I claim:
1. 3-acetamido-1,2,3,4-tetrahydrocarbazole.

References Cited

FOREIGN PATENTS

67/1,399   12/1967   Republic of South Africa
                                   Miles   260—315

OTHER REFERENCES

Dressler, Chem. Abstr., vol. 57, col. 5872 (1962).

DONALD G. DAUS, Primary Examiner

U.S. Cl. X.R.

260—242, 243 B, 247.5 R, 268 PH, 268 TR, 270 R, 295 S, 471 R, 487, 561 R, 563 C, 569; 424—246, 248, 250, 74

UNITED STATES PATENT OFFICE
CERTIFICATE OF CORRECTION

Patent No. 3,642,816 (SN 659,606)   Dated February 15, 1972

Inventor(s) Aram Mooradian

It is certified that error appears in the above-identified patent and that said Letters Patent are hereby corrected as shown below:

Column 2, line 9, "vitated" should read --vitiated--; line 55, "organic-metallic" should read --organo-metallic--.

Column 6, line 67, "alkyl," should read --alkyl",--.

Column 7, line 17, "intrperitoneally" should read --intraperitoneally--.

Column 9, line 59, "3-(dimehylamino)" should read --3-(dimethylamino)--; line 67, "3-(dimethyamino)-5-choro-6-methy" should read --3-(dimethylamino)-5-chloro-6-methyl--.

Column 10, line 56, "100 mg./kg." should read --100 mg./kg. (IP)--.

Column 11, line 11, "tetrahydrocarbzole" should read --tetrahydrocarbazole--; line 75, "253° C." should read --243° C.--.

Column 15, line 17, "25 mg." should read --25 g.--.

Column 16, line 69, "isolation" should read --tosylation--.

Column 17, line 24, "4-dimethylaminobutaylamine" should read --4-dimethylaminobutylamine--; line 44, "3-(3phenylpropylamino)" should read --3-(3-phenylpropylamino)--.

Column 18, line 29, "(4-methylthophenyl)" should read --(4-methylthiophenyl)--.

Signed and sealed this 28th day of November 1972.

(SEAL)
Attest:

EDWARD M. FLETCHER, JR.
Attesting Officer

ROBERT GOTTSCHALK
Commissioner of Patents